(12) United States Patent
Asayama

(10) Patent No.: US 9,840,979 B2
(45) Date of Patent: Dec. 12, 2017

(54) FUEL SUPPLY APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Kazuhiro Asayama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/259,781

(22) Filed: Sep. 8, 2016

(65) Prior Publication Data

US 2017/0074202 A1 Mar. 16, 2017

(30) Foreign Application Priority Data

Sep. 14, 2015 (JP) ................. 2015-180792

(51) Int. Cl.
| F02D 41/30 | (2006.01) |
| F02M 59/10 | (2006.01) |
| F02M 59/02 | (2006.01) |
| F02B 63/04 | (2006.01) |
| H02P 7/00 | (2016.01) |
| H02K 7/108 | (2006.01) |
| H02K 7/00 | (2006.01) |

(Continued)

(52) U.S. Cl.
CPC ........ *F02D 41/3082* (2013.01); *F02B 63/042* (2013.01); *F02D 41/3845* (2013.01); *F02M 59/025* (2013.01); *F02M 59/10* (2013.01); *H02H 1/00* (2013.01); *H02K 7/006* (2013.01); *H02K 7/108* (2013.01); *H02P 7/00* (2013.01); F02D 41/065 (2013.01); F02D 41/123 (2013.01); F02D 2250/04 (2013.01); F02N 11/0814 (2013.01)

(58) Field of Classification Search
CPC ... F02D 41/3082; F02D 41/065; F02M 59/10; F02M 59/025; F02B 63/002; H02P 7/00; H02K 7/108; H02K 7/006
See application file for complete search history.

(56) References Cited

U.S. PATENT DOCUMENTS

| 6,309,268 | B1 * | 10/2001 | Mabru | ...................... B63J 3/02 |
| | | | | 440/1 |
| 2002/0177374 | A1 * | 11/2002 | Mabru | ................. H01R 33/765 |
| | | | | 439/894 |
| 2004/0010360 | A1 * | 1/2004 | Kishibata | ................ F02B 63/04 |
| | | | | 123/3 |

FOREIGN PATENT DOCUMENTS

| JP | H09-303254 A | 11/1997 |
| JP | H10-4698 A | 1/1998 |
| JP | 2007-278167 A | 10/2007 |

* cited by examiner

*Primary Examiner* — Lindsay Low
*Assistant Examiner* — George Jin
(74) *Attorney, Agent, or Firm* — Oliff PLC

(57) ABSTRACT

A fuel supply apparatus for an internal combustion engine includes a motor, a fuel pump, an alternator, a centrifugal clutch, and an electronic control unit. The centrifugal clutch is configured to, when the rotation speed of the output shaft of the motor is higher than or equal to an engaging rotation speed, connect the output shaft of the motor with the rotary shaft of the alternator. The engaging rotation speed is a rotation speed higher than a rotation speed of the rotary shaft at which torque that acts on the rotary shaft as a result of generation of electric power by the alternator becomes maximum and is a rotation speed lower than a rotation speed at which torque for driving the high-pressure fuel pump cannot be provided by only the motor at the time when the motor is driven at rated output power.

5 Claims, 4 Drawing Sheets

(51) Int. Cl.
 *H02H 1/00* (2006.01)
 *F02D 41/38* (2006.01)
 *F02D 41/06* (2006.01)
 *F02D 41/12* (2006.01)
 *F02N 11/08* (2006.01)

FUEL SUPPLY APPARATUS FOR INTERNAL COMBUSTION ENGINE

INCORPORATION BY REFERENCE

The disclosure of Japanese Patent Application No. 2015-180792 filed on Sep. 14, 2015 including the specification, drawings and abstract is incorporated herein by reference in its entirety.

BACKGROUND

1. Technical Field

The present disclosure relates to a fuel supply apparatus for an internal combustion engine.

2. Description of Related Art

In a fuel supply apparatus for an internal combustion engine, described in Japanese Patent Application Publication No. 2007-278167 (JP 2007-278167 A), a clutch mechanism is interposed between one end of an output shaft of a motor and an exhaust camshaft of the internal combustion engine, and the other end of the output shaft of the motor and a drive shaft of a fuel pump are connected to each other.

With this fuel supply apparatus, the fuel pump is driven by only the driving force of the motor when the clutch mechanism is placed in a released state, and the fuel pump is driven by the driving force of the motor and the rotational force of the exhaust camshaft when the clutch mechanism is placed in an engaged state.

SUMMARY

Incidentally, under conditions in which electric power that is supplied to the direct-current motor is constant, the torque of a direct-current motor reduces as the rotation speed increases of the direct-current motor increases. For this reason, in order to prevent an increase in the size of the motor that drives the fuel pump, it is required to be able to assist in driving the fuel pump with the use of another driving force source at a high rotation speed at which the torque of the motor reduces. That is, when the motor is driven at rated output power, before the rotation speed of the motor becomes a rotation speed at which torque for driving the pump cannot be provided, the clutch mechanism needs to be placed in the engaged state.

The fuel supply apparatus described in JP 2007-278167 A assists in driving the fuel pump with the use of the exhaust camshaft in a state where the clutch mechanism is engaged. When the clutch mechanism is engaged, torque commensurate with load resulting from driving of the fuel pump acts on the exhaust camshaft. Therefore, in the fuel supply apparatus described in JP 2007-278167 A, the exhaust camshaft needs to be reinforced so as to withstand not only torque that is required to drive an exhaust cam but also torque that is required to assist in driving the fuel pump.

The present disclosure provides a fuel supply apparatus for an internal combustion engine, which is able to assist in driving a fuel pump without the necessity of reinforcing a rotary shaft that is used to assist in driving the fuel pump.

An aspect of the present disclosure provides a fuel supply apparatus for an internal combustion engine. The fuel supply apparatus includes a motor, a fuel pump, an alternator, a centrifugal clutch, and an electronic control unit. The motor includes an output shaft. The fuel pump is configured to be driven by rotation of the output shaft of the motor, and to supply pressurized fuel to the internal combustion engine. The alternator includes a rotary shaft that rotates with rotation of a crankshaft of the internal combustion engine. The alternator is configured to generate electric power as the rotary shaft is rotated. The centrifugal clutch is interposed between the output shaft of the motor and the rotary shaft of the alternator. The centrifugal clutch is configured to, when the rotation speed of the output shaft of the motor is higher than or equal to an engaging rotation speed, connect the output shaft of the motor with the rotary shaft of the alternator. The centrifugal clutch is configured to, when the rotation speed of the output shaft of the motor is lower than the engaging rotation speed, disconnect the output shaft of the motor from the rotary shaft of the alternator. The engaging rotation speed is a rotation speed higher than a rotation speed of the rotary shaft at which torque that acts on the rotary shaft as a result of generation of electric power by the alternator becomes maximum and is a rotation speed lower than a rotation speed at which torque for driving the fuel pump cannot be provided by only the motor at a time when the motor is driven at rated output power. The electronic control unit is configured to control the motor.

The alternator is generally configured to be able to ensure required electric power at the time when the rotation speed of the crankshaft falls within a service rotation range and be able to achieve maximum generated electric power in a state where the rotation speed of the crankshaft is low. For this reason, the generated electric power of the alternator peaks out at a relatively low rotation speed, and does not increase any more. The fact that the generated electric power peaks out means that the workload of the alternator peaks out. For this reason, load that acts on the rotary shaft also peaks out, and, under conditions in which the generated electric power peaks out, torque that acts on the rotary shaft of the alternator with generation of electric power reduces as the rotation speed of the rotary shaft increases.

The rotary shaft of the alternator is designed to withstand torque that acts with generation of electric power, so the generated electric power peaks out, and, when torque that acts with generation of electric power is small, the rotary shaft has an allowance for strength.

With the above configuration, when the rotation speed of the rotary shaft of the motor is higher than or equal to the engaging rotation speed, the output shaft of the motor and the rotary shaft of the alternator are connected with each other, and the fuel pump is assisted in driving by torque that is transferred from the crankshaft side to the output shaft of the motor via the rotary shaft of the alternator. Because the engaging rotation speed is higher than the rotation speed of the rotary shaft at which torque that acts on the rotary shaft with generation of electric power by the alternator becomes maximum, when the rotation speed is higher than or equal to the engaging rotation speed, torque is transmitted via the rotary shaft of the alternator in a state where the rotary shaft has an allowance for strength.

For this reason, with the fuel supply apparatus according to the above aspect, it is possible to connect the output shaft of the motor with the rotary shaft of the alternator via the centrifugal clutch by increasing the rotation speed of the output shaft of the motor to the engaging rotation speed or higher under control of the electronic control unit, and to transmit torque from the crankshaft side to the output shaft of the motor via the output shaft of the alternator. In this way, it is possible to assist in driving the fuel pump via the rotary shaft of the alternator in a state where the rotary shaft has an allowance for strength, so it is possible to assist in driving the fuel pump without the necessity of reinforcing the rotary shaft.

In the fuel supply apparatus according to the above aspect, the electronic control unit may be configured to, while fuel to the internal combustion engine is being cut off, control the motor such that rotation of the output shaft stops. With this aspect, while fuel to the internal combustion engine is being cut off, the rotation of the output shaft of the motor is stopped, so the rotation speed of the output shaft becomes lower than the engaging rotation speed, with the result that the output shaft of the motor is disconnected from the rotary shaft of the alternator by the centrifugal clutch. For this reason, it is possible to prevent unnecessary supply of electric power to the motor in a situation in which feeding of fuel by the fuel pump under pressure is not required, and it is possible to prevent load from acting on the rotary shaft of the alternator via the centrifugal clutch.

In the fuel supply apparatus according to the above aspect, the internal combustion engine may be mounted on a vehicle. The electronic control unit may be configured to control the rotation speed of the output shaft of the motor such that a frequency of pulsation of fuel, which is generated as a result of driving the fuel pump, is different from a frequency at which a fuel supply system, including fuel piping connected to the fuel pump, resonates.

When the frequency of pulsation of fuel, which is generated as a result of driving the fuel pump, coincides with the frequency at which the fuel supply system, including the fuel piping, resonates, noise that occurs from the fuel supply system increases as a result of resonation of the fuel supply system. According to this aspect, because the frequency of pulsation of fuel is brought to a frequency that does not coincide with the frequency at which the fuel supply system resonates, so resonance is hard to occur. For this reason, it is possible to prevent noise that occurs from the fuel supply system from increasing due to resonance of the fuel supply system, so it is possible to prevent an occupant of the vehicle from experiencing a feeling of strangeness.

In the fuel supply apparatus according to the above aspect, the electronic control unit may be configured to, during idle operation, control the rotation speed of the output shaft of the motor such that the frequency of pulsation of fuel, which is generated as a result of driving the fuel pump, is different from the frequency at which the fuel supply system resonates.

While idle operation of the internal combustion engine is being performed, the vehicle on which the internal combustion engine is mounted is mostly stopped, so, if noise of the fuel supply system is large, there is a concern that an occupant experiences a feeling of strangeness. According to this aspect, on the condition that idle operation is being performed, that is, on the condition that an occupant is easy to feel noise, the rotation speed of the output shaft is controlled such that the frequency of pulsation of fuel is different from the frequency at which the fuel supply system resonates. For this reason, in a situation that an occupant is easy to feel noise, it is possible to prevent an increase in noise of the fuel supply system due to resonance of the fuel supply system, so the advantageous effect that a feeling of strangeness that is experienced by an occupant is reduced is more remarkably exercised. In a situation that an occupant is hard to feel noise, it is possible to control the rotation speed of the output shaft without limitations as to whether the frequency of pulsation of fuel coincides with the frequency at which the fuel supply system resonates.

In the fuel supply apparatus according to the above aspect, the electronic control unit may be configured to, in advance of a restart of the internal combustion engine, control the motor such that the output shaft of the motor rotates at a rotation speed lower than the engaging rotation speed to drive the fuel pump.

When the output shaft of the motor is rotated at a rotation speed lower than the engaging rotation speed, it is possible to drive the fuel pump with the use of only the motor by not engaging the centrifugal clutch. For this reason, it is possible to start increasing the fuel pressure in advance of an engine restart, so the fuel pressure suitable for an engine restart is easily obtained.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, a first embodiment of a fuel supply apparatus for an internal combustion engine will be described with reference to FIG. 1 to FIG. 6. An internal combustion engine 1 to which the fuel supply apparatus according to the present embodiment is applied is an in-line four-cylinder gasoline engine that is mounted on a vehicle.

Figure 1:
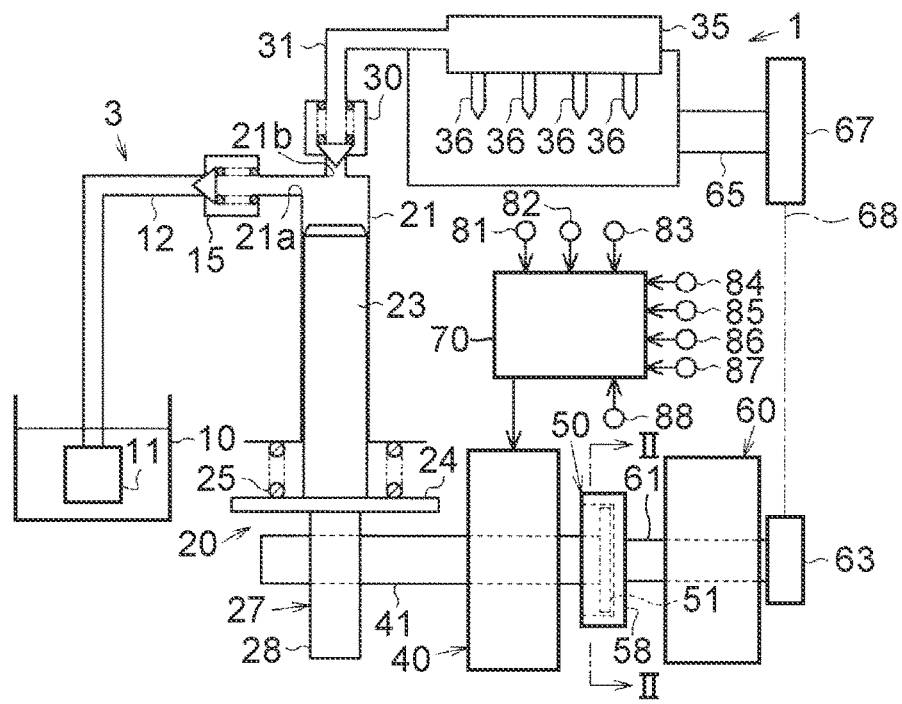
FIG. 1 is a schematic view that shows a fuel supply apparatus for an internal combustion engine according to a first embodiment and its peripheral mechanism.

As shown in FIG. 1, in a fuel supply system 3 of the internal combustion engine 1, a feed pump 11, a low-pressure fuel passage 12, a first check valve 15, a high-pressure fuel pump 20, a second check valve 30, a high-pressure fuel passage 31 and a delivery pipe 35 are sequentially connected. The feed pump 11 is an electric pump. The feed pump 11 draws fuel inside a fuel tank 10, and then feeds the fuel to the low-pressure fuel passage 12 under pressure.

The high-pressure fuel pump 20 includes a cylinder 21 and a plunger 23. The plunger 23 moves up and down inside the cylinder 21. A lifter 24 is fixed to the lower end of the plunger 23. The lifter 24 is urged by a spring 25 in a direction to lower the plunger 23. A drive cam 27 is in contact with the lower end face of the lifter 24. The drive cam 27 is secured to an output shaft 41 of a motor 40 (described later). The drive cam 27 rotates with the rotation of the output shaft 41 of the motor 40. As a cam nose 28 of the drive cam 27 pushes up the lifter 24 against the urging force of the spring 25 as a result of rotation of the drive cam 27, the plunger 23 rises. After the cam nose 28 pushes up the lifter 24, the lifter 24 is pushed down by the urging force of the spring 25, and the plunger 23 lowers. In this way, the plunger 23 periodically reciprocates up and down inside the cylinder 21 with the rotation of the drive cam 27.

The low-pressure fuel passage 12 is connected to a suction port 21a of the cylinder 21 via the first check valve 15. When the pressure inside the low-pressure fuel passage 12 is higher by a predetermined pressure or more than the pressure inside the cylinder 21, the first check valve 15 opens and permits flow of fuel from the low-pressure fuel passage 12 to the cylinder 21. On the other hand, even when the pressure inside the low-pressure fuel passage 12 is higher than the pressure inside the cylinder 21 but when a differential pressure between the pressure inside the low-pressure fuel passage 12 and the pressure inside the cylinder 21 is smaller than the predetermined pressure, or when the pressure inside the low-pressure fuel passage 12 is lower than the pressure inside the cylinder 21, the first check valve 15 closes and prohibits flow of fuel between the low-pressure fuel passage 12 and the cylinder 21.

A discharge port 21b of the cylinder 21 is connected to the high-pressure fuel passage 31 via the second check valve 30. When the pressure inside the cylinder 21 is higher by a predetermined pressure or more than the pressure inside the high-pressure fuel passage 31, the second check valve 30 opens and permits flow of fuel from the cylinder 21 to the high-pressure fuel passage 31. On the other hand, even when the pressure inside the cylinder 21 is higher than the pressure inside the high-pressure fuel passage 31 but when a differential pressure between the pressure inside the cylinder 21 and the pressure inside the high-pressure fuel passage 31 is smaller than the predetermined pressure, or when the pressure inside the cylinder 21 is lower than the pressure inside the high-pressure fuel passage 31, the second check valve 30 closes and prohibits flow of fuel between the cylinder 21 and the high-pressure fuel passage 31.

Thus, as the plunger 23 lowers and the pressure inside the cylinder 21 decreases, the second check valve 30 closes and the first check valve 15 opens, with the result that fuel is introduced into the cylinder 21 from the low-pressure fuel passage 12. As the plunger 23 rises and the pressure inside the cylinder 21 increases, the first check valve 15 closes and the second check valve 30 opens, with the result that fuel inside the cylinder 21 is discharged to the high-pressure fuel passage 31.

The high-pressure fuel passage 31 is connected to the delivery pipe 35. Four fuel injection valves 36 are connected to the delivery pipe 35. Each fuel injection valve 36 is mounted so as to face a combustion chamber provided in a corresponding one of cylinders of the internal combustion engine 1, and is used to directly inject fuel into the combustion chamber.

As described above, the drive cam 27 of the high-pressure fuel pump 20 rotates with the rotation of the output shaft 41 of the motor 40. The motor 40 is a direct-current motor. The drive cam 27 is fixed to one end of the output shaft 41 of the motor 40, and the other end of the output shaft 41 of the motor 40 is coupled to one end of a rotary shaft 61 of an alternator 60 via a centrifugal clutch 50. The alternator 60 generates electric power as the rotary shaft 61 rotates. A pulley 63 is provided at the other end of the rotary shaft 61 of the alternator 60. A drive belt 68 is wound around the pulley 63 and a crank pulley 67. The crank pulley 67 is provided at a crankshaft 65 of the internal combustion engine 1. As the rotation of the crankshaft 65 is transmitted to the pulley 63 by the drive belt 68, the rotary shaft 61 rotates. The rotation speed of the rotary shaft 61 of the alternator 60 with respect to the rotation speed of the crankshaft 65 is allowed to be adjusted in response to the ratio in circumference between the pulleys 63, 67. In the present embodiment, the rotary shaft 61 of the alternator 60 is configured to rotate at a rotation speed that is twice the rotation speed of the crankshaft 65.

Figure 2:
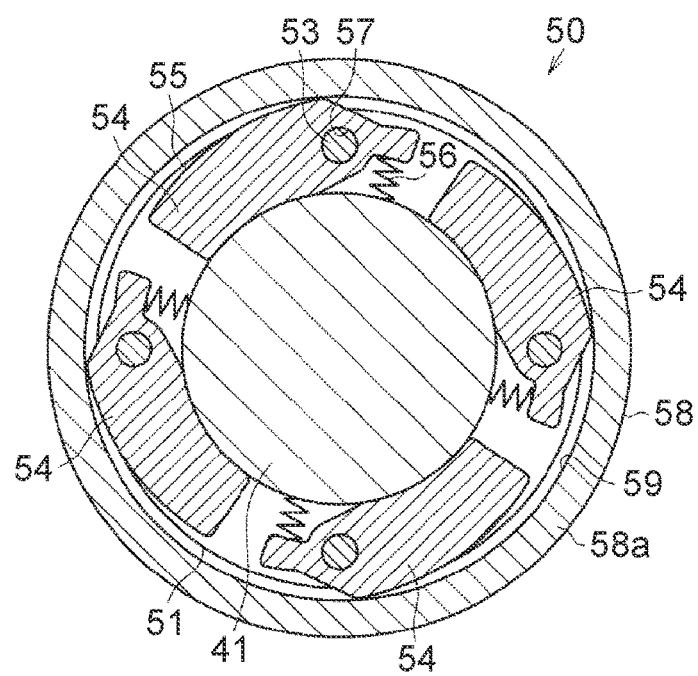
FIG. 2 is a cross-sectional view that is taken along the line II-II in FIG. 1 in a state where a centrifugal clutch is not engaged.
Figure 3:
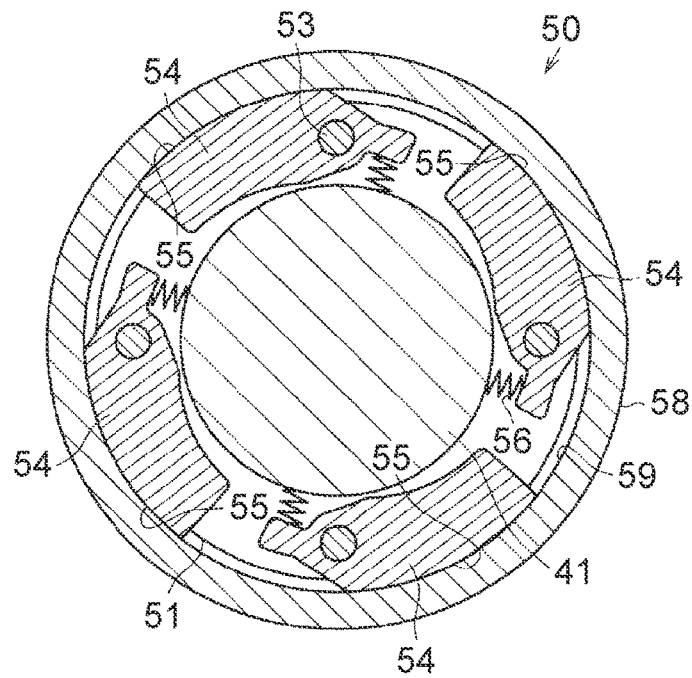
FIG. 3 is a cross-sectional view that is taken along the line II-II in FIG. 1 in a state where the centrifugal clutch is in an engaged state.

As shown in FIG. 1 to FIG. 3, the centrifugal clutch 50 includes a disc-shaped clutch plate 51 and a flat closed-end cylindrical clutch outer 58. The clutch outer 58 accommodates the clutch plate 51. The clutch plate 51 is fixed to the end of the output shaft 41 of the motor 40. The clutch outer 58 is fixed to one end of the rotary shaft 61 of the alternator 60.

As shown in FIG. 2, four weight shaft portions 53 are fixed to the clutch plate 51. The weight shaft portions 53 are arranged at equal intervals on a concentric circle about the output shaft 41 of the motor 40, and extend parallel to the output shaft 41 of the motor 40.

The centrifugal clutch 50 includes four clutch weights 54. Each clutch weight 54 has a through hole 57. The weight shaft portion 53 is inserted in each through hole 57. Thus, the clutch weights 54 are arranged between the output shaft 41 of the motor 40 and a cylindrical portion 58a of the clutch outer 58. A friction face 55 is provided on a face of each clutch weight 54, facing the cylindrical portion 58a of the clutch outer 58. The inner periphery of the cylindrical portion 58a of the clutch outer 58 is a friction face 59 that works with the clutch weights 54.

A spring 56 is arranged in a compressed state between one end of each clutch weight 54 and the output shaft 41 of the motor 40. That is, each spring 56 urges one end of the corresponding clutch weight 54 radially outward of the centrifugal clutch 50 with the weight shaft portion 53 set as the pivotal axis of the clutch weight 54. Thus, when the rotation speed of the output shaft 41 is low and centrifugal force that acts on the clutch weights 54 is small, the friction faces 55 of the clutch weights 54 are spaced apart from the friction face 59 of the clutch outer 58.

On the other hand, as the rotation speed of the output shaft 41 increases, centrifugal force that acts on the clutch weights 54 increases, and each clutch weight 54 pivots about the corresponding weight shaft portion 53 against the urging force of the corresponding spring 56. As a result, the friction faces 55 of the clutch weights 54 and the friction face 59 of the clutch outer 58 approach each other. As the rotation speed of the output shaft 41 becomes higher than or equal to an engaging rotation speed N1, as shown in FIG. 3, the friction faces 55 of the clutch weights 54 are pressed against the friction face 59 of the clutch outer 58 by centrifugal force. As a result, the centrifugal clutch 50 is engaged. When the centrifugal clutch 50 is engaged, the output shaft 41 of the motor 40 is connected with the rotary shaft 61 of the alternator 60 via the centrifugal clutch 50.

The mode of setting the engaging rotation speed N1 of the output shaft 41 at which the centrifugal clutch 50 is engaged will be described later. Incidentally, the alternator 60 is generally configured to be able to achieve maximum generated electric power in a state where the rotation speed of the crankshaft 65 is low such that required electric power is ensured at the time when the rotation speed of the crankshaft 65 falls within a service rotation range.

Figure 4:
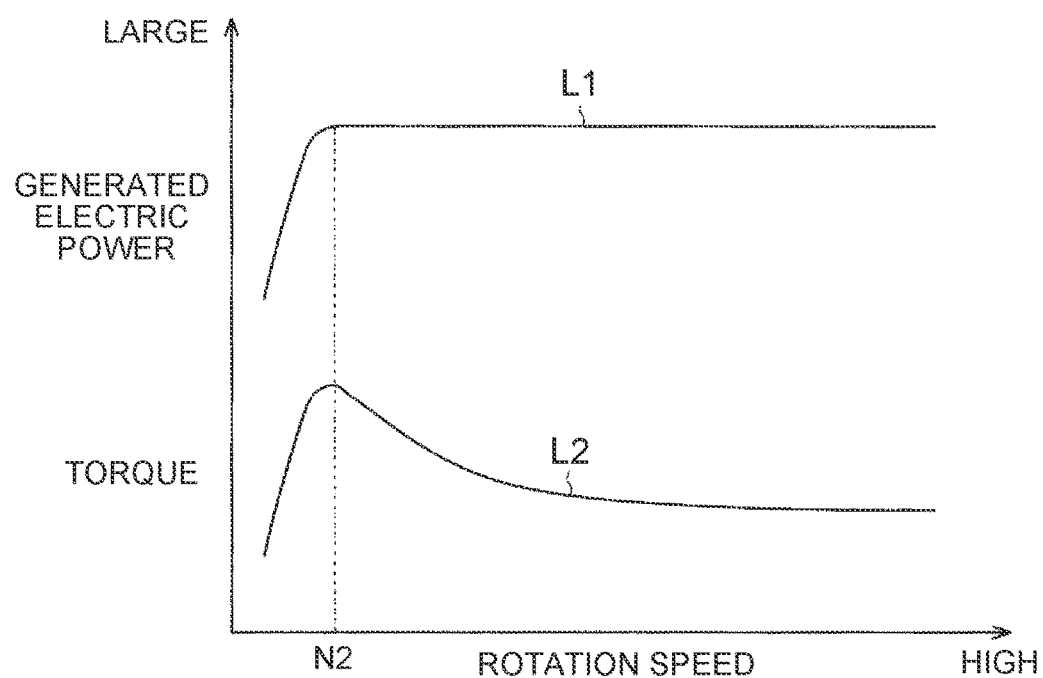
FIG. 4 is a graph that shows the relationship between a generated electric power and a torque for a rotation speed of a rotary shaft of an alternator according to the embodiment.

For this reason, as indicated by the line L1 in FIG. 4, the generated electric power of the alternator 60 peaks out at a relatively low reference rotation speed N2, and does not increase any more. The fact that the generated electric power peaks out means that the workload of the alternator 60 peaks out. For this reason, load that acts on the rotary shaft 61 also peaks out, and, under conditions in which the generated electric power peaks out as indicated by the line L2 in FIG. 4, torque that acts on the rotary shaft 61 of the alternator 60 with generation of electric power reduces as the rotation speed of the rotary shaft 61 increases.

The rotary shaft 61 of the alternator 60 is designed to withstand torque that acts with generation of electric power, so the generated electric power peaks out, and, when torque that acts with generation of electric power is small, the rotary shaft 61 has an allowance for strength.

Figure 5:
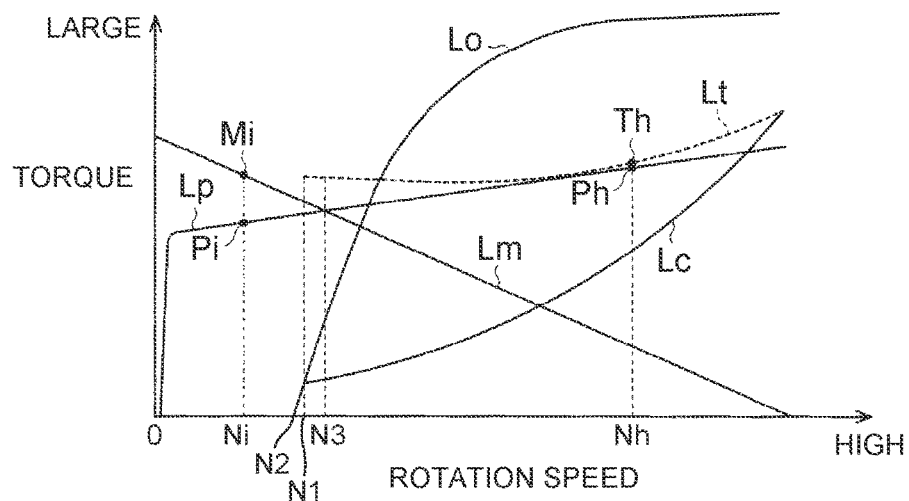
FIG. 5 is a graph that shows the relationship between the rotation speed and torque of each of a motor, high-pressure fuel pump and alternator according to the embodiment.

The continuous line Lm in FIG. 5 shows the relationship between a rotation speed and a torque at the time when the motor 40 is driven at rated output power. As described above, because the motor 40 is a direct-current motor, as indicated by the continuous line Lm, torque reduces as the rotation speed of the output shaft 41 increases. As indicated by the continuous line Lp, larger torque is required to drive the high-pressure fuel pump 20 as the rotation speed increases. As shown in FIG. 5, the continuous line Lm and the continuous line Lp intersect with each other at a rotation speed N3.

When the rotation speed of the output shaft 41 of the motor 40 is lower than or equal to the rotation speed N3, a torque indicated by the continuous line Lm is larger than or equal to a torque indicated by the continuous line Lp. For this reason, torque that is required to drive the high-pressure fuel pump 20 can be provided by only the motor 40. On the other hand, when the rotation speed of the output shaft 41 exceeds the rotation speed N3, a torque indicated by the continuous line Lm is smaller than a torque indicated by the continuous line Lp. For this reason, torque that is required to drive the high-pressure fuel pump 20 cannot be provided by only the motor 40.

As the output power of the motor 40 is reduced, torque at each rotation speed reduces, so the continuous line Lm shifts to the left lower side in FIG. 5. On the other hand, as the output power of the motor 40 is increased, torque at each rotation speed increases, so the continuous line Lm shifts to the right upper side in FIG. 5. However, the motor 40 is driven at rated output power or lower. For this reason, with this fuel supply apparatus, the rotation speed, at which the continuous line Lm and the continuous line Lp intersect with each other, cannot be increased over the rotation speed N3. That is, in this fuel supply apparatus, the rotation speed N3 is an upper limit value of the rotation speed of the output shaft 41 in the case where torque that is required to drive the high-pressure fuel pump 20 is provided by only the motor 40. Hereinafter, the rotation speed N3 is referred to as upper limit speed N3.

The engaging rotation speed N1 of the centrifugal clutch 50 is set within the range of the rotation speed, within which torque for driving the high-pressure fuel pump 20 is provided by only the motor 40. Specifically, the engaging rotation speed N1 is set to a rotation speed lower than or equal to the upper limit speed N3. In addition, the engaging rotation speed N1 is set to a rotation speed higher than the reference rotation speed N2 that is the rotation speed of the rotary shaft 61, at which torque that acts on the rotary shaft 61 with generation of electric power by the alternator 60 becomes maximum.

That is, the engaging rotation speed N1 is set to a rotation speed higher than the rotation speed of the rotary shaft 61, at which torque that acts on the rotary shaft 61 with generation of electric power by the alternator 60 becomes maximum, and lower than a rotation speed at which torque for driving the high-pressure fuel pump 20 is not provided by only the motor 40 when the motor 40 is driven at rated output power.

With this configuration, as the rotation speed of the output shaft 41 of the motor 40 becomes higher than or equal to the engaging rotation speed N1, the centrifugal clutch 50 is engaged, and torque can be transmitted from the crankshaft 65 side to the output shaft 41 of the motor 40 via the rotary shaft 61 of the alternator 60. Therefore, it is possible to assist in driving the high-pressure fuel pump 20 via the rotary shaft 61 of the alternator 60 in a state where the rotary shaft 61 has an allowance for strength, so it is possible to assist in driving the high-pressure fuel pump 20 without the necessity of reinforcing the rotary shaft 61.

As electric power is supplied to the motor 40 such that the output shaft 41 of the motor 40 becomes higher than or equal to the engaging rotation speed N1, the output shaft 41 of the motor 40 is connected with the rotary shaft 61 of the alternator 60 and rotates integrally with the rotary shaft 61 of the alternator 60. As described above, the rotary shaft 61 rotates at a rotation speed that is twice the engine rotation speed that is the rotation speed of the crankshaft 65, so, as the engine rotation speed increases, the rotation speed of the rotary shaft 61 increases. Therefore, when the rotation speed of the output shaft 41 of the motor 40 is higher than or equal to the engaging rotation speed N1, the discharge rate of the high-pressure fuel pump 20 per unit time increases as the engine rotation speed increases.

In the internal combustion engine 1, a fuel consumption amount increases as the load on the internal combustion engine 1 becomes higher or as the rotation speed of the internal combustion engine 1 becomes higher even at the same load, so the high-pressure fuel pump 20 needs to supply the engine 1 with a larger amount of fuel. Under conditions in which the output shaft 41 is connected with the alternator 60 and rotates integrally with the alternator 60, the high-pressure fuel pump 20 is configured to be able to supply the engine 1 with fuel in an amount that is required of the internal combustion engine 1 even in an engine operating state that provides maximum load at each engine rotation speed.

The continuous line Lo in FIG. 5 represents the relationship between the rotation speed of the rotary shaft 61 of the alternator 60 and the magnitude of transmittable torque based on an allowance for the strength of the rotary shaft 61. The continuous line Lc represents torque that the centrifugal clutch 50 is able to transmit. In FIG. 5, at any rotation speed higher than or equal to the rotation speed N1, a torque indicated by the continuous line Lc is smaller than a torque indicated by the continuous line Lo. For this reason, it is found that, in this supply apparatus, torque is transmitted via the centrifugal clutch 50 within the range in which torque can be transmitted by utilizing an allowance for the strength of the rotary shaft 61.

The dashed line Lt in FIG. 5 represents a combined torque of a torque that the centrifugal clutch 50 is able to transmit (torque indicated by the continuous line Lc) and a torque of the motor 40 (torque indicated by the continuous line Lm) in the case where the motor 40 is driven at rated output power. The rated output power of the motor 40 is set such that a combined torque indicated by the dashed line Lt is larger than or equal to a torque that is required to drive the high-pressure fuel pump 20 as indicated by the continuous line Lp.

As shown in FIG. 1, various control over the internal combustion engine 1 and its peripheral mechanism is executed by an electronic control unit 70. The electronic control unit 70 includes a central processing unit (CPU), a read only memory (ROM), a random access memory (RAM), and the like. The ROM prestores various programs, maps, and the like. The RAM temporarily stores computed results, and the like, of the CPU. Signals of various sensors provided in the vehicle are input to the electronic control unit 70.

As shown in FIG. 1, the various sensors provided in the vehicle include an accelerator sensor 81, a crank angle sensor 82, an air flow meter 83 and a fuel pressure sensor 84. The accelerator sensor 81 detects the depression amount of an accelerator pedal. The crank angle sensor 82 is used to detect the engine rotation speed. The air flow meter 83 detects the intake air amount of the internal combustion engine 1. The fuel pressure sensor 84 detects the fuel pressure inside the delivery pipe 35. The various sensors provided in the vehicle further include a brake sensor 85, a vehicle speed sensor 86, a position sensor 87, an ignition switch 88, and the like. The brake sensor 85 detects the depression amount of a brake pedal. The vehicle speed sensor 86 detects the travel speed of the vehicle. The position sensor 87 detects the position of a shift lever. The ignition switch 88 is used to manually operate a restart or stop of the internal combustion engine 1 by a driver.

The electronic control unit 70 executes various control over the internal combustion engine 1 and its peripheral mechanism on the basis of detected results of these various sensors. For example, the electronic control unit 70 executes fuel injection control over the fuel injection valves 36. That is, the electronic control unit 70 sets a target fuel injection amount suitable for the state of the vehicle, and executes valve opening control over the injection valves 36 such that fuel in the target fuel injection amount is injected from the fuel injection valves 36. The state of the vehicle is understood on the basis of detected results of the above-described various sensors. The state of the vehicle includes, for example, the load and engine rotation speed of the internal combustion engine 1, which are acquired from the depression amount of the accelerator pedal, the intake air amount, and the like. Therefore, for example, when the electronic control unit 70 determines that the rotation speed of the crankshaft 65 is required to be kept at an idle rotation speed on the basis of the load and engine rotation speed of the internal combustion engine 1, and the like, the electronic control unit 70 controls the fuel injection amount from the fuel injection valves 36 to a fuel injection amount suitable for idle operation. The electronic control unit 70 determines that there is a fuel cut request when there is a request to decelerate the vehicle or a request to decrease the engine rotation speed, for example, when the depression amount of the accelerator pedal has decreased during vehicle traveling, on the basis of detected signals of the various sensors, and stops injection of fuel from the fuel injection valves 36. The electronic control unit 70 controls the motor 40 in order to adjust the discharge rate of the high-pressure fuel pump 20 in response to a controlled state of the fuel injection valves 36. In this way, in the present embodiment, the motor 40, the high-pressure fuel pump 20, the alternator 60, the centrifugal clutch 50 and the electronic control unit 70 constitute the fuel supply apparatus that is used to supply fuel through the high-pressure fuel passage 31 to the delivery pipe 35 to which the fuel injection valves 36 are connected.

Figure 6:
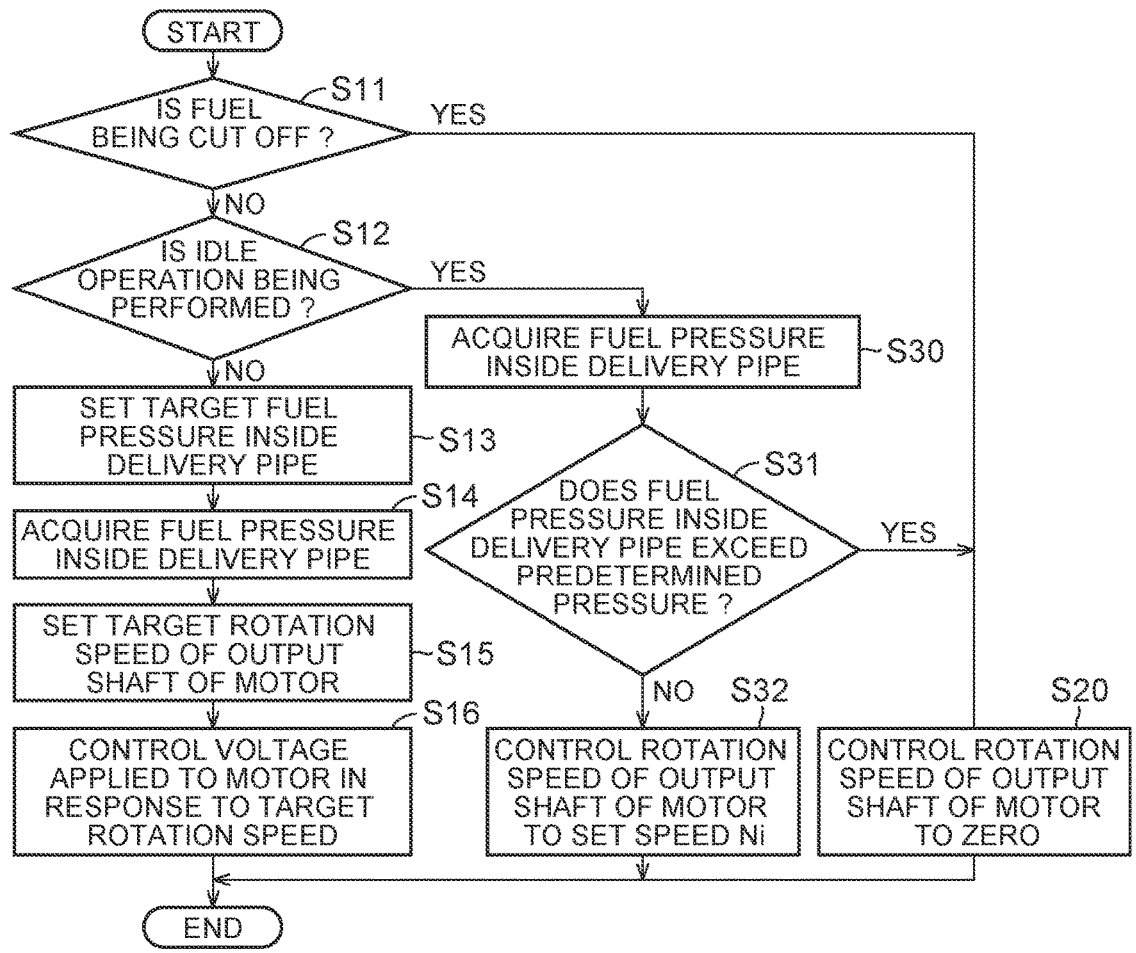
FIG. 6 is a flowchart that shows the procedure of executing motor control according to the embodiment.

More specifically, the electronic control unit 70 controls the motor 40 in accordance with the procedure shown in the flowchart of FIG. 6. The process shown in FIG. 6 is executed as interrupt process at predetermined intervals when the ignition switch 88 is in an on state.

As the process shown in FIG. 6 is started, it is determined in step S11 whether fuel is being cut off. When it is determined in step S11 that fuel is being cut off (YES in step S11), the process proceeds to step S20. In step S20, the rotation speed of the output shaft 41 of the motor 40 is controlled to zero by stopping application of voltage to the motor 40, after which the process once ends. Thus, in a state where fuel injection is stopped, driving of the high-pressure fuel pump 20 is stopped.

On the other hand, when it is determined in step S11 that fuel is not being cut off (NO in step S11), the process proceeds to step S12. In step S12, it is determined whether idle operation is being performed. When it is determined in step S12 that idle operation is being performed (YES in step S12), the process proceeds to step S30. In step S30, the electronic control unit 70 acquires a detected value of fuel pressure inside the delivery pipe 35 by reading a detected value of the fuel pressure sensor 84. In step S31, it is determined whether the fuel pressure inside the delivery pipe 35 exceeds a predetermined pressure. The predetermined pressure is an upper limit value of an appropriate range of the fuel pressure inside the delivery pipe 35 for performing idle operation, and is set by experiment, computation, or the like, in advance. When it is determined in step S31 that the fuel pressure inside the delivery pipe 35 exceeds the predetermined pressure (YES in step S31), the process proceeds to step S20. In step S20, the rotation speed of the output shaft 41 of the motor 40 is controlled to zero by stopping application of voltage to the motor 40, after which the process once ends. Thus, the fuel pressure inside the delivery pipe 35 decreases as soon as fuel is injected from any one of the fuel injection valves 36. This prevents continuation of a state where the fuel pressure inside the delivery pipe 35 exceeds the appropriate range of the fuel pressure for performing idle operation.

On the other hand, when it is determined in step S31 that the fuel pressure inside the delivery pipe 35 does not exceed the predetermined pressure (NO in step S31), the process proceeds to step S32. In step S32, voltage applied to the motor 40 is controlled such that the rotation speed of the output shaft 41 of the motor 40 becomes a set speed Ni, after which the process once ends.

The set speed Ni is the rotation speed of the output shaft 41, at which the frequency of pulsation of fuel inside the low-pressure fuel passage 12, which is generated as a result of driving the high-pressure fuel pump 20, is different from the frequency at which the fuel supply system 3 including a fuel pipe that constitutes the low-pressure fuel passage 12 resonates and it is possible to feed a sufficient amount of fuel to the delivery pipe 35 under pressure in order to perform idle operation. The set speed Ni is set by experiment, computation, or the like, in advance. As the frequency that is generated by pulsation of fuel inside the low-pressure fuel passage 12 becomes a natural number times of the natural frequency of the fuel supply system 3, the fuel supply system 3 resonates. For this reason, the set speed Ni is set to the rotation speed of the output shaft 41 such that the frequency that is generated by pulsation of fuel inside the low-pressure fuel passage 12 is different from a natural number times of the natural frequency of the fuel supply system 3. That is, the fuel pressure inside the low-pressure fuel passage 12 changes as a result of driving of the high-pressure fuel pump 20, so pulsation of fuel is generated inside the low-pressure fuel passage 12. For this reason, the rotation speed of the output shaft 41 is controlled to the set speed Ni in step S32, so resonance of the fuel supply system 3 due to pulsation of the low-pressure fuel passage 12 is prevented.

When it is determined in step S12 that idle operation is not being performed (NO in step S12), the process proceeds to step S13. In step S13, a target fuel pressure that is a target value of the fuel pressure inside the delivery pipe 35 is set. As described above, in accordance with a process different from the process shown in FIG. 6, the electronic control unit 70 sets the target fuel injection amount of the fuel injection valves 36 on the basis of the load, engine rotation speed, and the like, of the internal combustion engine 1, and controls the fuel injection valves 36 such that a target amount of fuel is injected from the fuel injection valves 36. In step S13, the target fuel pressure is, for example, set to a higher value as the target fuel injection amount in one valve opening period increases, and is set to a higher value as the engine rotation speed increases. That is, the target fuel pressure is set to a higher value as the fuel injection amount per unit time, which is required of the internal combustion engine 1, increases.

Subsequently, the process proceeds to step S14, and the electronic control unit 70 acquires a detected value of the fuel pressure inside the delivery pipe 35 by reading a detected value of the fuel pressure sensor 84. In step S15, the electronic control unit 70 sets a target rotation speed of the output shaft 41 of the motor 40. In step S15, initially, a higher reference speed is set as the target fuel pressure inside the delivery pipe 35 increases. The target rotation speed is set by correcting the reference speed on the basis of the degree of deviation between the detected value of the fuel pressure and the target fuel pressure. More specifically, when the detected value of the fuel pressure inside the delivery pipe 35 is lower than the target fuel pressure, a rotation speed obtained by adding a correction value (rotation speed) to the reference speed is set as the target rotation speed. The correction value (rotation speed) increases as the deviation between the detected value of the fuel pressure and the target fuel pressure increases. On the other hand, when the detected value of the fuel pressure inside the delivery pipe 35 is higher than the target fuel pressure, a rotation speed obtained by subtracting a correction value (rotation speed) from the reference speed is set as the target rotation speed. The correction value (rotation speed) increases as the deviation between the detected value of the fuel pressure and the target fuel pressure increases.

Subsequently, in step S16, the electronic control unit 70 controls voltage applied to the motor 40 in response to the target rotation speed of the output shaft 41 of the motor 40, after which the process once ends. More specifically, in step S16, when the target rotation speed of the motor 40 is lower than the upper limit speed N3, voltage applied to the motor 40 is increased with rated voltage set as an upper limit as the target rotation speed of the motor 40 increases. When the target rotation speed of the motor 40 is higher than or equal to the upper limit speed N3, the motor 40 is driven at rated output power by applying rated voltage to the motor 40.

Next, the operation of the present embodiment will be described with reference to FIG. 5 and FIG. 6. As described above, the motor 40 is controlled by the electronic control unit 70 in accordance with the procedure shown in the flowchart of FIG. 6.

Therefore, as shown in step S11 and step S20 in FIG. 6, while fuel to the internal combustion engine 1 is being cut off, rotation of the output shaft 41 of the motor 40 is stopped. At this time, the rotation speed of the output shaft 41 of the motor 40 is the rotation speed indicated by "0" in FIG. 5, and the output shaft 41 of the motor 40 is disconnected from the rotary shaft 61 of the alternator 60 via the centrifugal clutch 50.

As shown in step S12, step S30 to step S32 in FIG. 6, during idle operation of the internal combustion engine 1, when the fuel pressure inside the delivery pipe 35 is lower than or equal to the predetermined pressure, the rotation speed of the output shaft 41 of the motor 40 is set to the set speed Ni. Because the set speed Ni is lower than the engaging rotation speed N1 of the centrifugal clutch 50, the output shaft 41 of the motor 40 is not connected with the rotary shaft 61 of the alternator 60, and the high-pressure fuel pump 20 is driven with the use of only the motor 40. However, at this time, torque that is required to drive the high-pressure fuel pump 20 has a magnitude indicated by point P in FIG. 5, and is smaller than torque, indicated by point Mi, at the time when the motor 40 is driven at rated output power. Therefore, it is possible to drive the high-pressure fuel pump 20 with the use of only the motor 40.

For example, when the load on the internal combustion engine 1 is not so high, the target fuel pressure is also set to a low value, so the target rotation speed of the output shaft 41 of the motor 40 is also set so as to be lower than the engaging rotation speed N1. Therefore, the motor 40 is controlled to a rotation speed lower than the engaging rotation speed N1, with the result that the high-pressure fuel pump 20 is driven with the use of only the motor 40. In such a situation, as shown in FIG. 5, torque that is required to drive the high-pressure fuel pump 20 as indicated by the continuous line Lp is smaller than torque of the motor 40 as indicated by the continuous line Lm, so it is possible to drive the high-pressure fuel pump 20 at output power smaller than the rated output power with the use of only the motor 40.

When the target fuel pressure increases and the target rotation speed of the output shaft 41 of the motor 40 is set to the engaging rotation speed N1, voltage corresponding to the engaging rotation speed N1 is applied to the motor 40, with the result that the output shaft 41 is controlled so as to rotate at the engaging rotation speed N1. Thus, the output shaft 41 of the motor 40 is connected with the rotary shaft 61 of the alternator 60.

For example, at a high load and high rotation speed, or the like, the target fuel injection amount of the fuel injection valves 36 increases, and the target fuel pressure is set to a high value. As a result, when the target rotation speed of the output shaft 41 of the motor 40 becomes higher than or equal to the upper limit speed N3, the motor 40 is driven at rated output power. At this time, when the alternator 60 is rotating at a rotation speed Nh shown in FIG. 5, the output shaft 41 of the motor 40 is connected with the rotary shaft 61 of the alternator 60 via the centrifugal clutch 50, so the output shaft 41 also rotates integrally with the rotary shaft 61 at the rotation speed Nh. Combined torque in this case is the magnitude indicated by point Th, and is larger than torque that is required to drive the high-pressure fuel pump 20 as indicated by point Ph. In this way, the high-pressure fuel pump 20 is assisted in driving via the rotary shaft 61 of the alternator 60.

Under conditions in which the target rotation speed of the output shaft 41 of the motor 40 is higher than or equal to the engaging rotation speed N1, the output shaft 41 is connected with the rotary shaft 61 of the alternator 60 via the centrifugal clutch 50 and rotates integrally with the rotary shaft 61 of the alternator 60, so the output shaft 41 of the motor 40 can rotate at a rotation speed higher than the target rotation speed. In such a case, the fuel pressure inside the delivery pipe 35 becomes higher than the target fuel pressure. However, in that case, after that, in step S15 in the process of FIG. 6, the target rotation speed of the motor 40 is set to a low rotation speed. Therefore, when the target rotation speed lower than the engaging rotation speed Ni is set, the rotation speed of the output shaft 41 of the motor 40 is controlled to a rotation speed lower than the engaging rotation speed N1, and the output shaft 41 is disconnected from the rotary shaft 61 of the alternator 60 by the centrifugal clutch 50. Thus, the discharge rate of the high-pressure fuel pump 20 per unit time decreases, with the result that the fuel pressure inside the delivery pipe 35 decreases to the target fuel pressure.

In the present embodiment described in detail above, the following advantageous effects (1) to (3) are obtained.

(1) It is possible to assist in driving the high-pressure fuel pump 20 via the rotary shaft 61 of the alternator 60 in a state where the rotary shaft 61 has an allowance for strength, so it is possible to assist in driving the high-pressure fuel pump 20 without the necessity of reinforcing the rotary shaft 61.

(2) The rotation of the output shaft 41 of the motor 40 is stopped while fuel is being cut off, so it is possible to prevent supply of unnecessary electric power to the motor 40 in a situation in which fuel does not need to be fed by the high-pressure fuel pump 20 under pressure, and it is possible to prevent load from acting on the rotary shaft 61 of the alternator 60 via the centrifugal clutch 50.

(3) During idle operation of the internal combustion engine 1, the vehicle on which the engine 1 is mounted is mostly stopped, so, if noise of the fuel supply system 3 is large, an occupant may experience a feeling of strangeness. In the present embodiment, on the condition that idle operation is being performed, that is, on the condition that an occupant is easy to feel noise, the rotation speed of the output shaft 41 of the motor 40 is controlled to the set speed Ni. Therefore, in a situation in which a feeling of strangeness due to noise is easy to be remarkable, it is possible to prevent an increase in noise of the fuel supply system 3 due to resonance, so the advantageous effect that a feeling of strangeness that is experienced by an occupant of the vehicle is reduced is more remarkably exercised.

In the present embodiment, when idle operation is not being performed, it is possible to control the rotation speed of the output shaft 41 of the motor 40 without limitations as to whether the frequency that is generated by pulsation of fuel coincides with the frequency at which the fuel supply system 3 resonates.

Next, a second embodiment of a fuel supply apparatus for an internal combustion engine will be described with reference to FIG. 7. In the present embodiment, the electronic control unit 70 executes automatic stop control for automatically stopping engine operation when a predetermined stop condition is satisfied during operation of the internal combustion engine 1, and executes automatic restart control for automatically restarting engine operation when a predetermined restart condition is satisfied during an automatic stop. The other components are the same as those of the first embodiment, so like reference numerals denote the same components, and the description thereof is omitted where appropriate.

An example of the predetermined stop condition may be a condition in which all of the following conditions are satisfied. The conditions include a condition that any one of the fact that a shift position is placed in D range and the depression amount of the brake pedal is larger than or equal to a predetermined amount and the fact that the shift position is placed in stopped range, such as P range and N range, is satisfied, a condition that the depression amount of the accelerator pedal is zero, a condition that the vehicle speed is zero, a condition that engine operation is allowed to be stopped because load of auxiliaries, and the like, is lower than a predetermined value, and the like.

An example of the predetermined restart condition during an automatic stop may a condition in which at least one of the following conditions is satisfied. The conditions include a condition that the depression amount of the brake pedal is zero in a state where the shift position is placed in D range, a condition that the shift position has been changed from the stopped position to D range or R range and a condition that load of the auxiliaries, and the like, exceeds a predetermined value at which engine operation is required.

As the predetermined stop condition is satisfied during engine operation, the electronic control unit 70 stops the operation of the internal combustion engine 1 by stopping injection of fuel from the fuel injection valves 36. As the predetermined restart condition is satisfied during an automatic stop, the electronic control unit 70 starts the operation of the internal combustion engine 1 by starting fuel injection from the fuel injection valves 36.

Figure 7:
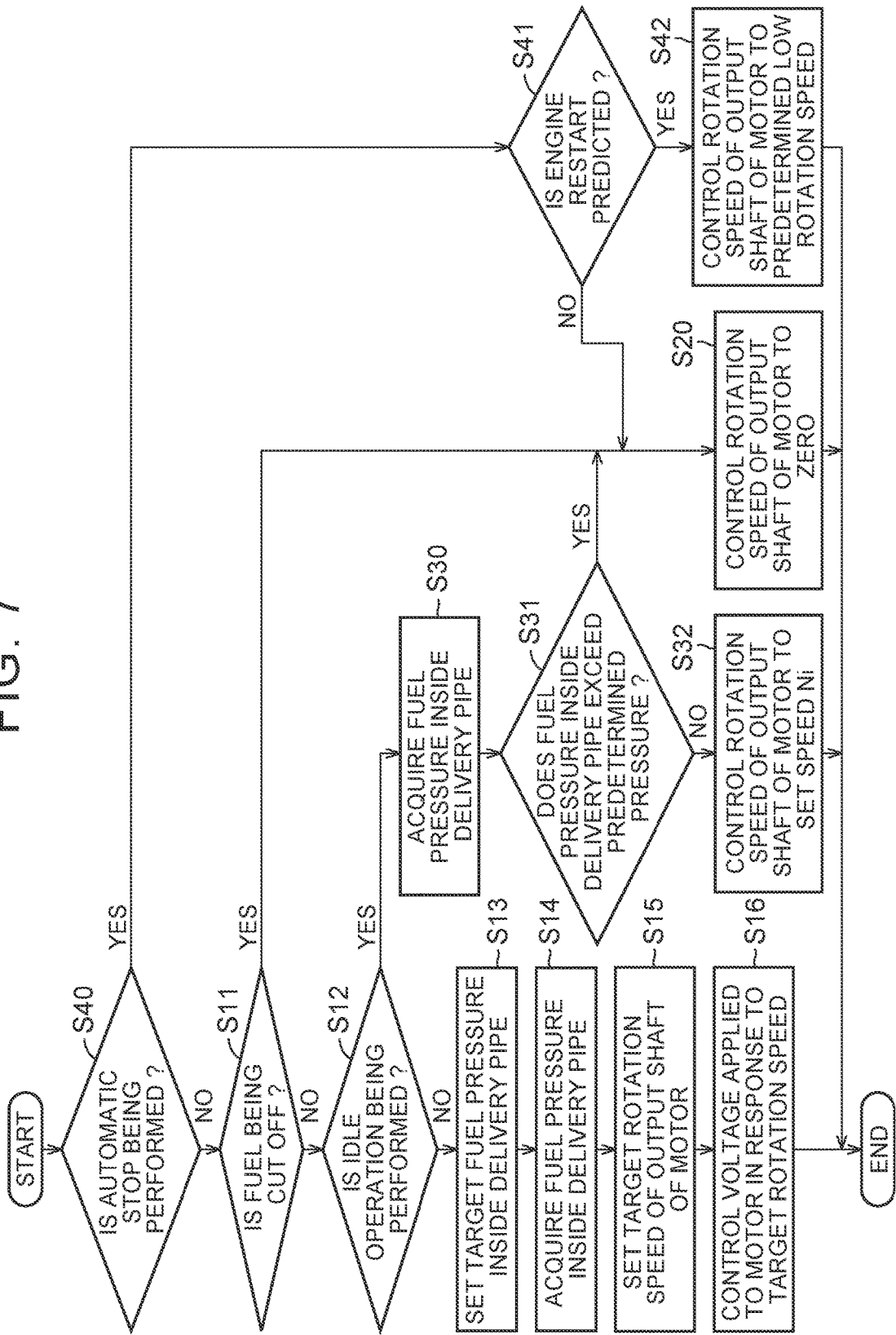
FIG. 7 is a flowchart that shows the procedure of executing motor control in a fuel supply apparatus for an internal combustion engine according to a second embodiment.

The electronic control unit 70 controls the rotation speed of the output shaft 41 of the motor 40 in accordance with the procedure shown in the flowchart of FIG. 7. The process shown in FIG. 7 is executed as interrupt process at predetermined intervals when the ignition switch 88 is in the on state. The procedure of the flowchart of FIG. 7 includes the processes of step S40 to step S42 in addition to the flowchart of FIG. 6, so the process different from the flowchart of FIG. 6 will be described in detail, and the description of the same process as that of FIG. 6 is omitted where appropriate.

As the process shown in FIG. 7 is started, it is determined in step S40 whether an automatic stop is being performed. When an automatic stop is being performed as a result of the fact that the automatic stop condition is satisfied, it is determined in step S40 that an automatic stop is being performed (YES in step S40), and then the process proceeds to step S41.

In step S41, it is determined whether an engine restart is predicted. When it is predicted that the predetermined restart condition is satisfied, it is determined that an engine restart is predicted. More specifically, when at least one of the following conditions is satisfied, it is determined that an engine restart is predicted. The conditions include a condition that the depression amount of the brake pedal has reduced although the depression amount is not zero in a state where the shift position is placed in D range, a condition that the brake pedal has been depressed at the time when the shift position is placed in the stopped range, and a condition that the load of the auxiliaries, and the like, has increased although the load has not reached the predetermined value at which engine operation is required.

When it is determined in step S41 that an engine restart is predicted (YES in step S41), the process proceeds to step S42. In step S42, the rotation speed of the output shaft 41 of the motor 40 is controlled to a predetermined low rotation speed, after which the process once ends. The predetermined low rotation speed is set to a rotation speed lower than the engaging rotation speed Ni. When the high-pressure fuel pump 20 is driven during an automatic stop, the feed pump 11 is being driven.

When it is determined in step S40 that an automatic stop is not being performed (NO in step S40), the process proceeds to step S11. As for the process from step S11, a similar process to the process shown in FIG. 6 is executed.

When it is determined in step S41 that an engine restart is not predicted during an automatic stop as well (NO in step S41), the process proceeds to step S20. In step S20, application of voltage to the motor 40 is stopped, and the rotation speed of the output shaft 41 of the motor 40 is controlled to zero, after which the process once ends. That is, when an engine restart is not predicted during an automatic stop, it is estimated that an automatic stop continues thereafter, so driving of the high-pressure fuel pump 20 is stopped.

Next, the operation of the present embodiment will be described. In the present embodiment, on the condition that a restart of the internal combustion engine 1 is predicted during an automatic stop, the electronic control unit 70 drives the high-pressure fuel pump 20 by rotating the output shaft 41 of the motor 40 at a rotation speed lower than the engaging rotation speed Ni. For this reason, in a state where the internal combustion engine 1 is stopped, the centrifugal clutch 50 is not engaged, and the high-pressure fuel pump 20 is driven with the use of only the motor 40. The fuel pressure inside the delivery pipe 35 is increased in advance of a restart of the internal combustion engine 1.

According to the present embodiment, the advantageous effects of (1) to (3) in the first embodiment and the following advantageous effect of (4) are obtained. (4) In the present embodiment, it is possible to increase the fuel pressure inside the delivery pipe 35 in advance of a restart of the internal combustion engine 1, so it becomes easy to obtain fuel pressure suitable for a restart at the time of an engine restart.

The fuel supply apparatus for an internal combustion engine is not limited to the configuration illustrated above, and may be implemented as, for example, the following alternative embodiments modified from the above fuel supply apparatus as needed. The following alternative embodiments, where appropriate, may be combined with and applied to each of the above-described embodiments as needed.

In the second embodiment, in the internal combustion engine 1 that is automatically stopped and automatically restarted, when an engine restart is predicted during an automatic stop, the output shaft 41 of the motor 40 is rotated at a rotation speed lower than the engaging rotation speed N1 in advance of the engine restart. The condition for predicting an engine restart during an automatic stop may be a condition other than the condition illustrated as the condition for making affirmative determination in step S41. For example, when a period during which the internal combustion engine 1 is automatically stopped continues for a predetermined period or longer, an automatic restart may be predicted, and the output shaft 41 of the motor 40 may be rotated.

Not during an automatic stop of the internal combustion engine 1 but during a manual stop where the ignition switch 88 is in an off state, when an engine restart is predicted, the output shaft 41 of the motor 40 may be rotated at a rotation speed lower than the engaging rotation speed N1 in advance of an engine restart. For example, on the condition that opening and closing of a door of the vehicle, sitting in a state where the ignition switch 88 is in the off state, sitting on a driver seat, or the like, has been detected, an engine restart may be predicted, and the output shaft 41 of the motor 40 may be rotated at a rotation speed lower than the engaging rotation speed N1. In this case, after the output shaft 41 of the motor 40 is rotated at a rotation speed lower than the engaging rotation speed N1, when the ignition switch 88 has not been changed into the on state for a predetermined period or longer, the rotation of the output shaft 41 of the motor 40 may be stopped. In driving the high-pressure fuel pump 20 by driving the motor 40 at the time when the ignition switch 88 is in the off state, the feed pump 11 is also driven under control of the electronic control unit 70. The configuration that rotates the output shaft 41 of the motor 40 in advance of an engine restart during a manual stop may also be employed in the internal combustion engine 1 for which the electronic control unit 70 does not execute automatic stop control or automatic restart control over the internal combustion engine 1.

In each of the above-described embodiments, when it is determined that fuel to the internal combustion engine 1 is not being cut off and it is determined that idle operation is being performed, the rotation speed of the output shaft 41 is controlled to the set speed Ni or zero such that the frequency that is generated by pulsation of fuel resulting from driving the high-pressure fuel pump 20 is different from the frequency at which the fuel supply system 3 resonates. However, when it is determined that idle operation is being performed without determining whether fuel to the internal combustion engine 1 is being cut off, the rotation speed of the output shaft 41 may be controlled such that the frequency that is generated by pulsation of fuel is different from the frequency at which the fuel supply system 3 resonates.

Irrespective of the operating state of the internal combustion engine 1, that is, without determining whether fuel is being cut off or determining whether idle operation is being performed, the rotation speed of the output shaft 41 may be controlled such that the frequency that is generated by pulsation of fuel is different from the frequency at which the fuel supply system 3 resonates. In this case, under conditions in which the target rotation speed of the output shaft 41 of the motor 40 is lower than the engaging rotation speed N1, the electronic control unit 70 controls the rotation speed of the output shaft 41 to a set rotation speed lower than the engaging rotation speed N1 that is set such that the frequency caused by pulsation of fuel is different from the frequency at which the fuel supply system 3 resonates and fuel suitable for the engine operating state can be supplied. The rotation of the output shaft 41 should be stopped when the fuel pressure inside the delivery pipe 35 exceeds an appropriate value corresponding to the engine operating state. When the target rotation speed of the output shaft 41 is set so as to be higher than or equal to the engaging rotation speed N1, the output shaft 41 of the motor 40 rotates integrally with the rotary shaft 61 of the alternator 60. Therefore, in the case where the output shaft 41 of the motor 40 is caused to rotate integrally with the rotary shaft 61 of the alternator 60, when the frequency caused by pulsation of fuel is different from the frequency at which the fuel supply system 3 resonates, the electronic control unit 70 maintains engagement of the centrifugal clutch 50 by controlling voltage applied to the motor 40. On the other hand, in the case where the output shaft 41 of the motor 40 is caused to rotate integrally with the rotary shaft 61 of the alternator 60, when the frequency caused by pulsation of fuel becomes the frequency at which the fuel supply system 3 resonates, the electronic control unit 70 releases the centrifugal clutch 50 by decreasing voltage applied to the motor 40. The electronic control unit 70 controls the rotation speed of the output shaft 41 of the motor 40 to a set rotation speed that is lower than the engaging rotation speed N1 and that is set in advance such that the frequency caused by pulsation of fuel is different from the frequency at which the fuel supply system 3 resonates. In the case where such a mode is employed, the capacity of the delivery pipe 35 should be set such that, even when the rotation speed of the output shaft 41 decreases as a result of releasing the centrifugal clutch 50, fuel in an amount that is required of the internal combustion engine 1 can be supplied to the engine 1.

Control over the rotation speed of the output shaft 41 for preventing resonance of the fuel supply system 3 may be executed only when the target rotation speed of the output shaft 41 is lower than the engaging rotation speed Ni.

In controlling the rotation speed of the output shaft 41 in the case where the target rotation speed of the output shaft 41 is lower than the engaging rotation speed N1, the rotation of the output shaft 41, at which the frequency of pulsation of fuel resulting from driving the high-pressure fuel pump 20 is different from the frequency at which the fuel supply system 3 resonates, does not need to be set in advance by experiment, computation, or the like. For example, the target rotation speed of the output shaft 41 is set and voltage applied to the motor 40 is controlled such that the fuel pressure inside the delivery pipe 35 becomes a target pressure, and the frequency caused by pulsation of fuel inside the low-pressure fuel passage 12 is calculated on the basis of a detected result of a sensor that detects the fuel pressure inside the low-pressure fuel passage 12. When this frequency coincides with the frequency at which the fuel supply system 3 resonates, the rotation speed of the output shaft 41 may be controlled by increasing or decreasing the target rotation speed of the output shaft 41 such that the frequency of pulsation of fuel does not coincide with the frequency at which the fuel supply system 3 resonates.

The configuration of controlling the rotation speed of the output shaft 41 such that the frequency of pulsation of fuel, which is generated as a result of driving the high-pressure fuel pump 20, is different from the frequency at which the fuel supply system 3 resonates does not always need to be employed.

In each of the above-described embodiments, while fuel to the internal combustion engine 1 is being cut off, the electronic control unit 70 controls the motor 40 such that the rotation of the output shaft 41 is stopped. However, the configuration of stopping the rotation of the output shaft 41 while fuel to the internal combustion engine 1 is being cut off does not always need to be employed. The rotation of the output shaft 41 may be stopped only when it is estimated that fuel cut of the internal combustion engine 1 continues for a predetermined period or longer.

In the above-described embodiments, the cylinder 21 of the high-pressure fuel pump 20 is connected to the low-pressure fuel passage 12 via the first check valve 15. However, the high-pressure fuel pump 20 may include an electromagnetic valve that is able to control the duration of communication between the cylinder 21 and the low-pressure fuel passage 12 and control the communication/interruption state between the cylinder 21 and the low-pressure fuel passage 12 via the electromagnetic valve. Thus, it is possible to adjust the amount of returning part of fuel once introduced into the cylinder 21 through energization control over the electromagnetic valve, so it is possible to adjust the discharge rate of fuel per one cycle in which the plunger 23 of the high-pressure fuel pump 20 moves up and down.

In each of the above-described embodiments, drive control over the high-pressure fuel pump 20 for switching the centrifugal clutch 50 between an engaged state and a non-engaged state by controlling the rotation speed of the output shaft 41 is described. The electronic control unit 70 may be configured to control the motor 40 such that the output shaft 41 of the motor 40 and the rotary shaft 61 of the alternator 60 are connected with each other while the centrifugal clutch 50 is caused to slip. In such a case, by controlling the rotation speed of the motor 40, it is possible to control the amount of driving the high-pressure fuel pump 20 by controlling the degree of causing the centrifugal clutch 50 to slide as well. The centrifugal clutch 50 just needs to be configured to be placed in the engaged state as the rotation speed of the output shaft 41 of the motor 40 becomes higher than or equal to the engaging rotation speed N1. A specific configuration, such as the number and shape of the clutch weights 54, is not specifically limited.

The internal combustion engine 1 according to each of the embodiments is an in-line four-cylinder gasoline engine mounted on a vehicle. However, the internal combustion engine 1 may be a diesel engine. The internal combustion engine 1 may be an internal combustion engine of a type other than an in-line four-cylinder type or may be an internal combustion engine not mounted on a vehicle. A multiplying factor of the rotation speed of the rotary shaft 61 of the alternator 60 to the rotation speed of the crankshaft 65 is not limited to twice illustrated in the above embodiments.

What is claimed is:

1. A fuel supply apparatus for an internal combustion engine, the fuel supply apparatus comprising:
   a motor including an output shaft;
   a fuel pump configured to be driven by rotation of the output shaft of the motor, the fuel pump being configured to supply pressurized fuel to the internal combustion engine;
   an alternator including a rotary shaft that rotates with rotation of a crankshaft of the internal combustion engine, the alternator being configured to generate electric power as the rotary shaft is rotated;
   a centrifugal clutch interposed between the output shaft of the motor and the rotary shaft of the alternator, the centrifugal clutch being configured to, when a rotation speed of the output shaft of the motor is higher than or equal to an engaging rotation speed, connect the output shaft of the motor with the rotary shaft of the alternator, the centrifugal clutch being configured to, when the rotation speed of the output shaft of the motor is lower than the engaging rotation speed, disconnect the output shaft of the motor from the rotary shaft of the alternator, the engaging rotation speed being a rotation speed higher than a rotation speed of the rotary shaft at which torque that acts on the rotary shaft as a result of generation of electric power by the alternator becomes maximum and being a rotation speed lower than a rotation speed at which torque for driving the fuel pump cannot be provided by only the motor at a time when the motor is driven at rated output power; and
   an electronic control unit configured to control the motor.

2. The fuel supply apparatus according to claim 1, wherein the electronic control unit is configured to, while fuel to the internal combustion engine is being cut off, control the motor such that rotation of the output shaft stops.

3. The fuel supply apparatus according to claim 1, wherein the internal combustion engine is mounted on a vehicle, and
   the electronic control unit is configured to control the rotation speed of the output shaft of the motor such that a frequency of pulsation of fuel, which is generated as a result of driving the fuel pump, is different from a frequency at which a fuel supply system, including fuel piping connected to the fuel pump, resonates.

4. The fuel supply apparatus according to claim 3, wherein the electronic control unit is configured to, during idle operation, control the rotation speed of the output shaft of the motor such that the frequency of pulsation of fuel, which is generated as a result of driving the fuel pump, is different from the frequency at which the fuel supply system resonates.

5. The fuel supply apparatus according to claim 1, wherein the electronic control unit is configured to, in advance of a restart of the internal combustion engine, control the motor such that the output shaft of the motor rotates at a rotation speed lower than the engaging rotation speed to drive the fuel pump.

\* \* \* \* \*